United States Patent
Klug et al.

(10) Patent No.: US 10,389,771 B2
(45) Date of Patent: Aug. 20, 2019

(54) METHOD FOR TRANSMITTING DATA IN A MULTIMEDIA SYSTEM, AND SOFTWARE PRODUCT AND DEVICE FOR CONTROLLING THE TRANSMISSION OF DATA IN A MULTIMEDIA SYSTEM

(71) Applicant: Unify GmbH & Co. KG, Munich (DE)

(72) Inventors: Karl Klug, Miesbach (DE); Patrick Kleiner, Munich (DE)

(73) Assignee: Unify GmbH & Co. KG, Munich (DE)

( * ) Notice: Subject to any disclaimer, the term of this patent is extended or adjusted under 35 U.S.C. 154(b) by 176 days.

(21) Appl. No.: 15/549,879

(22) PCT Filed: Feb. 8, 2016

(86) PCT No.: PCT/EP2016/025007
§ 371 (c)(1),
(2) Date: Aug. 9, 2017

(87) PCT Pub. No.: WO2016/128145
PCT Pub. Date: Aug. 18, 2016

(65) Prior Publication Data
US 2018/0020030 A1   Jan. 18, 2018

(30) Foreign Application Priority Data
Feb. 9, 2015   (DE) .................. 10 2015 001 622

(51) Int. Cl.
*G06F 15/16*   (2006.01)
*H04L 29/06*   (2006.01)
(52) U.S. Cl.
CPC ........ *H04L 65/403* (2013.01); *H04L 65/1089* (2013.01); *H04L 65/4015* (2013.01)

(58) Field of Classification Search
CPC ............... H04L 65/403; H04L 65/1089; H04L 65/4015
(Continued)

(56) References Cited

U.S. PATENT DOCUMENTS 7,684,565 B2 * 3/2010 Medvinsky ......... H04L 63/0457
380/255
9,432,426 B2 * 8/2016 Mao .................... H04N 21/4305
(Continued)

FOREIGN PATENT DOCUMENTS

CN          1830211 A      9/2006
CN       101061712 A     10/2007
(Continued)

OTHER PUBLICATIONS

International Search Report for PCT/EP2016/025007 dated May 2, 2016 (German).
(Continued)

*Primary Examiner* — Melvin H Pollack
(74) *Attorney, Agent, or Firm* — Buchanan Ingersoll & Rooney PC

(57) ABSTRACT

Method and software product for transferring data, plus equipment for controlling data transfer in a multimedia system that includes a group of participants' terminals, with which multimedia data generated by participants' terminals contained in the group are sent to one or more participants' terminals contained in the group and played back there. A central synchronization unit generates synchronization labels containing time information and sends them to the participants' terminals contained in the group, and the synchronization labels are used to play back information in modified time.

10 Claims, 2 Drawing Sheets

(58) Field of Classification Search
USPC .......................................................... 709/204
See application file for complete search history.

(56) References Cited

U.S. PATENT DOCUMENTS

| | | | |
|---|---|---|---|
| 9,665,895 B2* | 5/2017 | Alston | H04W 4/023 |
| 9,686,323 B1* | 6/2017 | Helter | H04L 65/1066 |
| 9,826,012 B2* | 11/2017 | Hao | H04L 65/60 |
| 9,846,563 B2* | 12/2017 | Li | H04N 21/8547 |
| 9,936,012 B2* | 4/2018 | Park | H04L 65/403 |
| 9,967,403 B1* | 5/2018 | Narayanaswamy | H04L 12/16 |
| 2001/0004767 A1* | 6/2001 | Gordon | H04N 7/17336 725/87 |
| 2009/0157750 A1* | 6/2009 | Kim | G11B 27/3027 |
| 2011/0161836 A1 | 6/2011 | Mu et al. | |

FOREIGN PATENT DOCUMENTS

| | | |
|---|---|---|
| CN | 103155584 A | 6/2013 |
| EP | 0898424 A2 | 2/1999 |
| KR | 20090116145 A | 11/2009 |
| KR | 20120084252 A | 7/2012 |

OTHER PUBLICATIONS

Written Opinion of the International Searching Authority for PCT/EP2016/025007 dated May 2, 2016 (German).
Chinese Search Report for Chinese Patent Application Serial No. 201680009435X.

* cited by examiner

METHOD FOR TRANSMITTING DATA IN A MULTIMEDIA SYSTEM, AND SOFTWARE PRODUCT AND DEVICE FOR CONTROLLING THE TRANSMISSION OF DATA IN A MULTIMEDIA SYSTEM

CROSS-REFERENCE TO RELATED APPLICATIONS

This application is the United States national phase under 35 U.S.C. § 371 of PCT International Patent Application No. PCT/EP2016/025007, filed on Feb. 8, 2016, and claiming the benefit of priority to German patent application no. 10 2015 001 622.9, filed on Feb. 9, 2015.

BACKGROUND OF THE INVENTION

Field of the Invention
Embodiments relate to methods for transferring data in a multimedia system plus a software product and equipment for controlling data transfer in a multimedia system.
Background of the Related Art
Audio and/or video are already known types of synchronous communication. In addition, e-mail, chat, IM, etc. (in general: text communication) are known forms of asynchronous communication. Synchronous communication existed in the past only as audio, video, or audio together with video. In addition to or parallel to those, there is asynchronous communication, e.g., in text form, which has a semantic relationship with synchronous communication. Many new types of communication have recently been introduced, such as e-mail, SMS, instant messaging, chat, twitter, YouTube, sensoring, QR tags, digital marking, etc. All of these communication forms together generate a dynamic context for the currently running synchronous communication.
To date, these various types of communication have not been synchronized, but rather must be resolved manually by the user or statically using network processes (during a managed video conference, for example). Even with video conferences, it often occurs that, due to the involvement of mobile participants, audio conferences are taking place in parallel to video conferences, which can impair lip synching. To date, only expensive video room systems have been able to solve this problem locally in the conference room.
DE 60203779 T2 describes an expansion of SDPng (ng: next generation), that uses the End-to-End Negotiation Protocol (E2ENP) to ensure End-to-End Quality of Service (QoS), even when mobile terminals are involved. The transmission conditions of mobile terminals can vary over time and are adapted dynamically. To do this, SDPng is used to pre-define a set of capabilities, qualities, and adapting mechanisms, so that a protocol can be defined at the application level.
According to US 2002154210 A1, a shared multimedia collaboration system makes it possible to send both synchronous (audio, video) communication and asynchronous communication (text, graphics, e-mail, controls).
Until now, synchronous and asynchronous communication have not been synchronized with each other, unless it was done manually, even when they are used in parallel and form a common dynamic context. This concerns in particular so-called "decomposed devices," whose capabilities such as audio and video transmission are assigned to separate devices.

BRIEF SUMMARY OF THE INVENTION

One purpose of the present invention is to provide an improved method for transferring data in a multimedia system, plus a software product and equipment for controlling data transfer in a multimedia system. These should in particular be able to at least in part overcome the existing disadvantages of the prior art.

One advantage of the invention lies in the fact that it concerns a method for transferring data in a multimedia system plus a software product and equipment for controlling data transfer in a multimedia system, which make it possible to reproduce multimedia data sent by transmitting participants' terminals in a defined time context so that they are in the same context when received by one or more receiving participants' terminals. Advantageously, it is possible to synchronize synchronous and asynchronous communication.

Embodiments provide methods and software products for transferring data, plus equipment for controlling data transfer in a multimedia system that includes a group of participants' terminals (100, 200, 300), with which multimedia data generated by participants' terminals contained in the group are sent to one or more participants' terminals contained in the group and played back there. A central synchronization unit (ZTU) (500) generates synchronization labels containing time information and sends them to the participants' terminals (100, 200, 300) contained in the group. Each of the participants' terminals contained in the group receives the synchronization labels and attaches the received synchronization labels to the multimedia data generated in the participants' terminal and sends the multimedia data with the received synchronization labels attached to the central synchronization unit (500). The central synchronization unit receives the multimedia data with the attached synchronization labels and modifies the time information contained in the synchronization labels according to a time context for the multimedia data sent by the participants' terminals and sends it to the participants' terminals (100, 200, 300) to be played back. The multimedia data with the attached modified synchronization labels are received in the participants' terminals and played back in the time context corresponding to the modified time information contained in the synchronization labels.

BRIEF DESCRIPTION OF THE FIGURES

In the following, examples of embodiments of the invention are described in more detail based on figures. The figures show.

Figure 1:
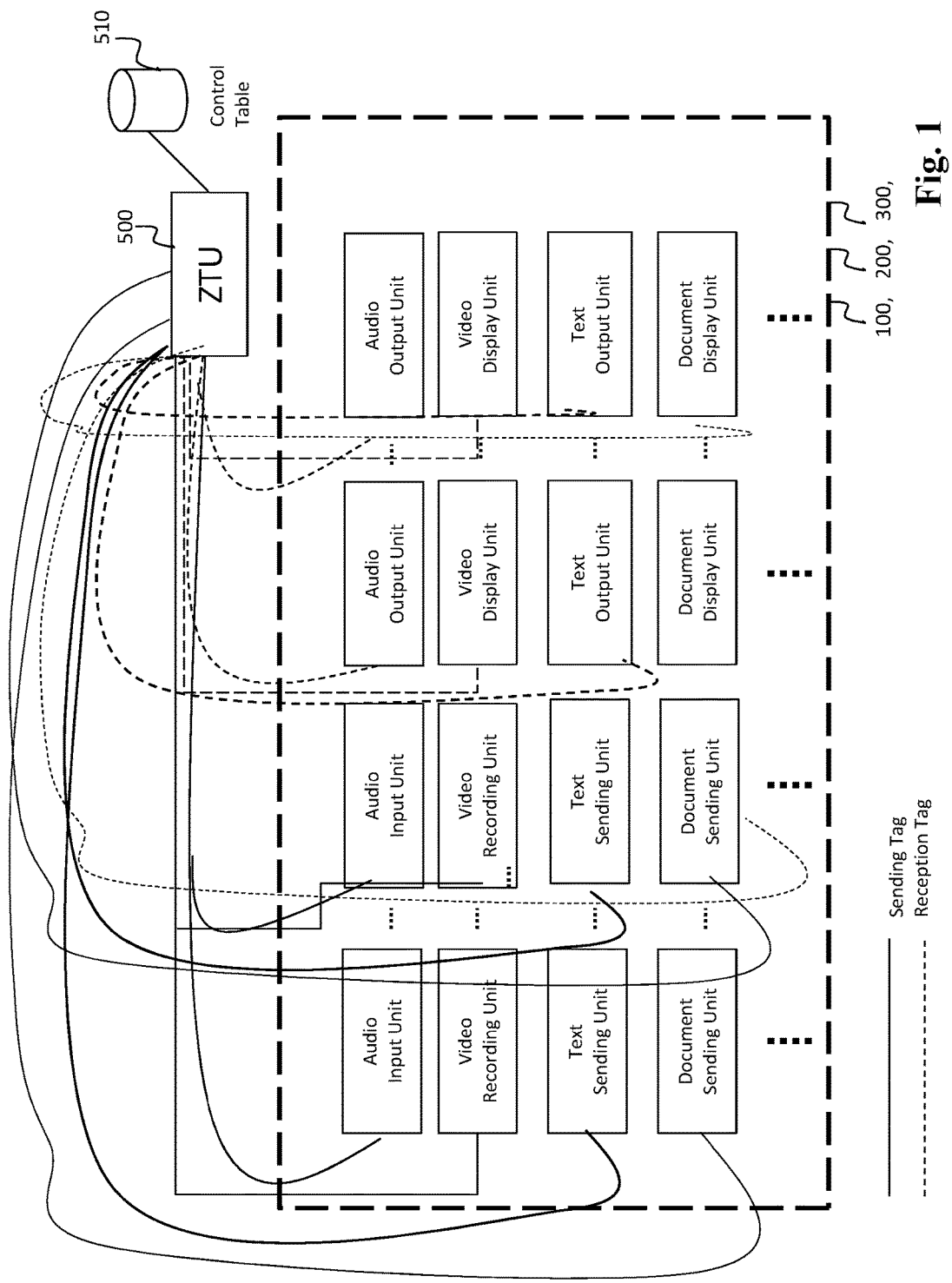
FIG. 1 a schematic representation of one part of a multimedia system, in which multimedia data are synchronized by a central synchronization unit (ZTU) on a terminal consisting of multiple input and output instances for different media types, e.g., a large-scale video system with one large screen and multiple smaller screens as well as several microphones arranged around the room and multiple speakers arranged around the room, according to one embodiment of the invented method.

The figures are schematic presentations and not according to scale. The graphic representations and their descriptions are intended only to illustrate the principle of the invention and shall in no way be understood as limiting the invention.

Ideas and concepts that a person skilled in the prior art can understand and use are not explained specifically in the following descriptions.

DETAILED DESCRIPTION OF THE INVENTION

A first aspect of the invention concerns a method for transmitting data in a multimedia system that comprises a group of participants' terminals, in which multimedia data generated by participants' terminals contained in the group are sent to one or more participants' terminals contained in the group and played back there, wherein a central synchronization unit generates synchronization labels containing time information and sends them to the participants' terminals contained in the group, each participant's terminal contained in the group receives the synchronization labels and attaches the received synchronization labels to the multimedia data generated in the participant's terminal and sends the multimedia data with the received synchronization labels attached to the central synchronization unit. The central synchronization unit receives the multimedia data with the synchronization labels attached and modifies the time information contained in the synchronization labels corresponding to a time context for the multimedia data sent by the participants' terminals and sends it to the participants' terminals for playback, and the multimedia data with the modified synchronization labels attached are received on the participants' terminals and played back in the time context corresponding to the modified time information contained in the synchronization labels.

According to one embodiment, the central synchronization unit receives the multimedia data with synchronization labels and modifies the time information contained in the synchronization labels corresponding to the control information which takes into account the properties of the participants' terminals that are sending and receiving the multimedia data and the properties of the transmission path.

In this embodiment, control information can be contained in a control table located in the central synchronization unit, which is used to generate the synchronization labels, which contain at least one context tag that describes the way the medium is used in the conversation, one conversation tag representing a unit of order for all the conversations managed by the central synchronization unit (ZTU), and one media tag describing the type of medium.

According to one embodiment, the control information, corresponding to which the time information contained in the synchronization labels is modified, is dynamically adapted.

The multimedia data can be transmitted in the form of data packets, and respective synchronization labels are assigned to the data packets.

According to this embodiment, data packets can be transmitted with differing lengths of time, whereby synchronization labels are generated corresponding to a periodic time sequence whose period length is equal to or shorter than the length of the data packet with the shortest period length.

According to one embodiment, the synchronization labels contain a time stamp.

According to another embodiment, the synchronization labels contain a counted value corresponding to the respective time and based on a preset starting time.

Another aspect of the invention concerns a software product that is stored on a computer-readable medium and can preferably be installed directly into the internal memory of a computer, in particular a central synchronization unit (ZTU), and has the program codes for a computer program enabling a computer to carry out the method steps of a method according to one of the preceding exemplary embodiments, when the computer program is run on the computer.

Another aspect of the invention concerns equipment for controlling the transmission of data in a multimedia system that comprises a group of participants' terminals, in which multimedia data generated by participants' terminals contained in the group are sent to one or more participants' terminals contained in the group and played back there, wherein the equipment comprises a central synchronization unit (ZTU) whose purpose is to generate synchronization labels containing time information and send them to each of the participants' terminals contained in the group, wherein the participants' terminals receive the synchronization labels and attach the received synchronization labels to the multimedia data generated in the participant's terminal and send the multimedia data with the received synchronization labels attached to the central synchronization unit, and the central synchronization unit is able to receive the multimedia data with the synchronization labels attached and modify the time information contained in the synchronization labels corresponding to a time context for the multimedia data sent by the participants' terminals and send it to the participants' terminals, wherein the multimedia data with the modified synchronization labels attached are to be received on the participants' terminals and played back in the time context corresponding to the modified time information contained in the synchronization labels.

FIG. 1 shows a schematic representation of one part of a multimedia system consisting of multiple input and output instances in the form of a group of terminals 100, 200, 300 for different media types. Only one of the terminals 100, 200, 300 is shown in FIG. 1.

The multimedia system includes, as later described with reference to FIG. 2, a group of participants' terminals 100, 200, 300, so that multimedia data generated by participants' terminals contained in the group are sent to one or more participants' terminals contained in the group and played back there. These can be, for example, a large-scale video system with one large screen and multiple smaller screens as well as several microphones arranged around the room and multiple speakers arranged around the room. However, the one or more terminals 100, 200, 300 can also include mobile telephones, video or PC cameras, or similar devices.

In the exemplary embodiment shown, as illustrated in FIG. 1, each of the terminals 100, 200, 300 contains an audio input unit, a video recording unit, a text sending unit, and a document sending unit, as well as an audio output unit, a video display unit, a text output unit, and a document display unit.

For the purpose of synchronizing the multimedia data, there is a central synchronization unit (also called "ZTU") 500 that is to generate synchronization labels containing time information and send them to the terminals 100, 200, 300 contained in the group, or at least those intended for receiving multimedia data.

A synchronization label, hereinafter called a "synchronization tag" or—especially in assemblies—briefly called a "tag" (from the English translation "tag" for the German word meaning "label"), in the exemplary embodiment described here consists of three logical segments, designated here as "context tag," "conversation tag," and "media tag." A context tag describes the way the medium is used in a conversation (e.g., real-time communication, static communication, streaming dataflow, etc.). A conversation tag represents a unit of order for all conversations managed by the ZTU 500 (e.g., ZTUxxx-nnnnn). A media tag describes the type of medium (e.g., dynamic video, streaming video, audio, podcast, text, document, image, etc.). There is one tag per media type in the sending and receiving directions.

The synchronization tags are generated either manually or automatically depending on the type of communication environment and placed in a data storage bank. A conversation tag can be a concatenation of a name assigned to the ZTU 500 and a numbering sequence, e.g., ZTU001-0027.

Figure 2:
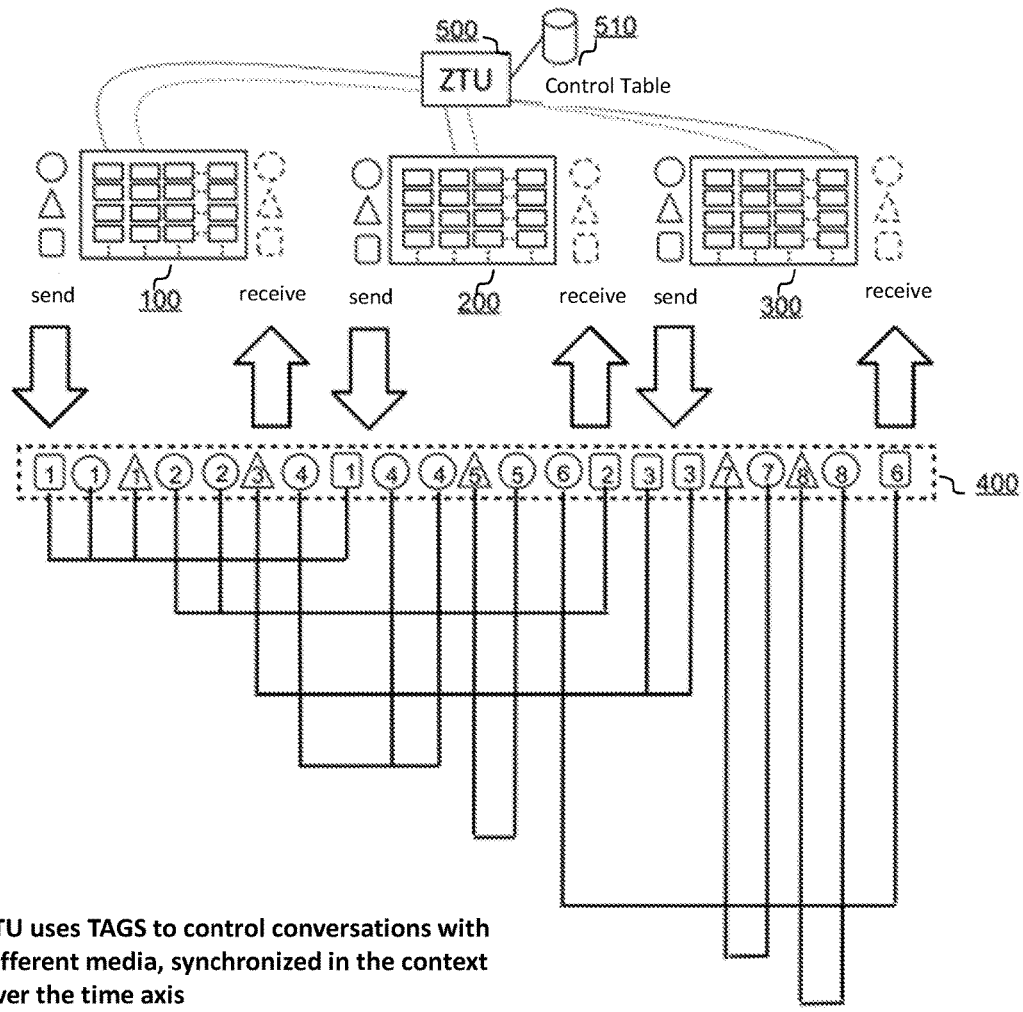
FIG. 2 a block diagram of one embodiment of the invention, in which a central synchronization unit (ZTU) synchronizes conversations containing multimedia data with different media in the context using synchronization labels (tags).

As now described with reference to FIG. 2, the central synchronization unit (ZTU) 500 sends the synchronization tags containing the time information to the participants' terminals contained in the group; for improved clarity, only three participants' terminals 100, 200, 300 of the type illustrated in FIG. 1 are shown in FIG. 2.

As already explained, multimedia data generated by one or more of the participants' terminals 100, 200, 300 contained in the group should be sent in the multimedia system to one or more of the other participants' terminals 100, 200, 300 contained in the group and played back there.

As shown schematically with solid lines in FIGS. 1 and 2, the central synchronization unit 500 sends the synchronization tags to each participant's terminal 100, 200, 300 contained in the group (or at least those intended for sending multimedia data), and each of these participants' terminals 100, 200, 300 receives the synchronization tags and attaches the received tags to the multimedia data generated in each participant's terminal 100, 200, 300, and then sends the multimedia data with the received synchronization tags attached to the central synchronization unit 500.

The central synchronization unit 500 receives the multimedia data with the attached synchronization tags and modifies the time information contained in the synchronization tags according to a time context for the multimedia data sent by the participants' terminals and then sends the multimedia data with the modified synchronization tags attached at least to the participants' terminals in the group of the participants' terminals 100, 200, 300, in which the multimedia data are to be played back. Transmission of the modified reception tags to the participants' terminals 100, 200, 300 is shown schematically with dashed lines in FIGS. 1 and 2.

In the participants' terminals in the group of participants' terminals 100, 200, 300, on which the multimedia data are to be played back, the multimedia data with the attached modified synchronization tags are received and played back in the time context corresponding to the modified time information. In other words, the central synchronization unit 500 controls the media streams in such a way that data packets with matching modified time information contained in the synchronization tags are played back in a time context, i.e., offered to the output units synchronously or at the proper time. "Synchronously or at the proper time" means playback in the sense of fulfilling a corresponding time context, not necessarily in the sense of "at the same time."

Buffering is used to ensure that media packets received late or at different times due to differing transmission or processing times are assembled for the same period, so that they can be made available for output at the same time. This can happen in various units, e.g., for documentation storage, at the customer's end, or in the conference unit.

The time information, provided in the form of a time stamp in the exemplary embodiment described here, is chosen such that the time stamp is entered synchronously with the shortest time interval, which is dependent upon the media channel used. For video, for example, a time stamp of 30 ms is normal. The synchronization unit 500 enters the modified centralized time stamps into the time stamps for the asynchronously received media packets. Standardized protocol elements, such as the RTC-P protocol that is used for SIP and WebRTC, can be used for this.

The multimedia data can be transmitted in the form of data packets, and respective synchronization labels can be assigned to the data packets.

Data packets can be transmitted with differing lengths of time, whereby synchronization tags are generated corresponding to a periodic time sequence whose period length is equal to or shorter than the length of the data packet with the shortest period length, e.g., the 30 ms mentioned above for video.

As an alternative to having the synchronization labels contain a time stamp, the synchronization tags can contain a counted value corresponding to the respective time and based on a preset starting time, similar to plesiochronous clocking.

The central synchronization unit 500 receives the multimedia data with synchronization tags attached and modifies time information contained in the synchronization tag corresponding to the control information, which takes into account the properties of the participants' terminals 100, 200, 300 that are sending and receiving the multimedia data and the properties of the transmission path, indicated in FIG. 2 with the reference 400.

In the exemplary embodiment described here, the control information is contained in a control table 510 located in the central synchronization unit. It is used to generate the synchronization tags. As already explained above, these can contain one context tag that describes the way the medium is used in the conversation, one conversation tag representing a unit of order for all the conversations managed by the central synchronization unit (ZTU), and one media tag describing the type of medium. Preferably, the control information, corresponding to which the time information contained in the synchronization tags is modified, is dynamically adapted.

The tags are generated either manually or automatically depending on the communication environment and placed in the control table in the manner of a data bank. A conversation tag can be displayed as a concatenation of the name of the ZTU 500 and a numbering sequence, e.g., ZTU001-0027.

In FIG. 2, media data belonging to a certain conversation on the transmission path 400, i.e., media data that are in the same time context, are indicated with the same numbers. Thus, eight conversations, numbered 1-8, are shown. The shapes of the outlines around the numbers, i.e., square, circle, or triangle, indicate the media type as well as the time requirement and priority for its transmission. Therefore, a circular outline indicates "audio" with the parameters: real time, high sensitivity, small packets, no packet loss, priority=1. A triangular outline indicates "video" with the parameters: real time, high sensitivity, large packets, no packet loss, priority=1, and a square outline indicates "text" with the parameters: large packets, low packet loss, priority=2. Priority=1 is ranked above priority=2.

The data transfer process in the multimedia system can be illustrated as follows: In a first step, the central synchronization unit (ZTU) 500 queries all units of the terminals 100, 200, 300 contained in the group for the respective media stream profiles. From that the ZTU 500 generates a send tag (S-tag) consisting of the previously explained context, conversation, and media tag components. The S-tag is sent periodically by the ZTU 500 to the (input) units of the terminals 100, 200, 300, which then attach the same tag to their media streams and send them. The run times from the ZTU 500 to the terminals are negligible. The length of the shortest period for a medium is 30 ms, for example. To minimize the message volume, as already explained above, a starting point, period length, and number of periods can be sent to the terminals 100, 200, 300.

The central synchronization unit 500 controls the media streams in such a way that a tag is attached to the packets (data, audio, video, streaming, IM, chat, etc.) when they are generated in the sending terminal 100, 200, 300, and packet and tag are sent as one expanded packet. The ZTU 500 is a work-flow engine type whose operation is table-controlled. Stored in the control table 510 is the sequence in which the respective reception tags (R tags) are sent to the terminals 100, 200, 300 intended for reception. This results in a chronological order for the media types included in a particular communication context, which prevents any out-of-queue occurrences in the system, for example. The synchronization unit 500 controls the media streams such that, for example, packets with the same time stamp are sent at the same time to the output units of the terminals 100, 200, 300 intended for reception.

Differing processing times on different terminals 100, 200, 300 to be synchronized (e.g., video and mobile phone) are taken into account in the control table and can be dynamically adapted if necessary.

The fact that the terminals (e.g., video and mobile phone) have no mutual or corresponding time basis (i.e., each terminal has its own "clock" and they are not synchronized) is taken into account by having the terminals replicate the tag received from the central synchronization unit 500. The ZTU 500 thus serves as a central synchronization instance, consolidating multiple partially linear independent media streams into one context.

The input units of the terminals 100, 200, 300 send their data packets with the respective tag to the ZTU 500. When all data packets belonging to one tag have arrived, the ZTU 500 generates an R-tag (reception tag), replacing the S-tag in the data packets, and sends the data packets to the receiver(s) in the form of the terminals 100, 200, 300. In this way, the media data streams from different, physically separate data sources of an endpoint are synchronized, so that lip-synchronization between the video data stream from a camera and the independent audio data stream from a telephone is achieved.

Alternatively, in place of or in addition to the central synchronization unit (ZTU) 500, a local synchronization unit (LTU) can be used to synchronize the data streams of one single endpoint. A "decomposed device" appears together with its assigned LTU as a single physically uniform terminal.

We claim:

1. A method for transmitting data in a multimedia system that includes a group including participants' terminals, with which multimedia data generated by participants' terminals contained in the group are sent to one or more participants' terminals contained in the group and played back there, comprising:

generating synchronization labels through a central synchronization unit, said synchronization labels containing time information, and sending them to the participants' terminals contained in the group;

receiving the synchronization labels through each of the participants' terminals contained in the group, attaching the received synchronization labels to the multimedia data generated in the participants' terminal, and sending the multimedia data with the received synchronization labels attached to the central synchronization unit;

receiving, through the central synchronization unit the multimedia data with the attached synchronization labels, modifying the time information contained in the synchronization labels according to a time context for the multimedia data sent by the participants' terminals, and sending the multimedia data to the participants' terminals to be played back; and receiving the multimedia data with the attached modified synchronization labels through the participants' terminals and playing back the multimedia data in the time context corresponding to the modified time information contained in the synchronization labels.

2. The method of claim 1, wherein the central synchronization unit receives the multimedia data with synchronization labels and modifies the time information contained in the synchronization labels corresponding to the control information, which takes into account the properties of the participants' terminals that are sending and receiving the multimedia data and the properties of the transmission path.

3. The method of claim 2, wherein the control information is contained in a control table located in the central synchronization unit, wherein the control table generates the synchronization labels, said synchronization labels containing at least one context tag that describes the way the medium is used in the conversation, one conversation tag representing a unit of order for all the conversations managed by the central synchronization unit, and one media tag describing the type of medium.

4. The method of claim 2, wherein the control information corresponding to which the time information contained in the synchronization labels is modified is dynamically adapted.

5. The method of claim 1, wherein the multimedia data are transmitted in the form of data packets and respective synchronization labels are assigned to the data packets.

6. The method of claim 5, wherein data packets are transmitted with differing period lengths, and wherein synchronization labels are generated corresponding to a periodic time sequence whose period length is equal to or shorter than the length of the data packet with the shortest period length.

7. The method of claim 1, wherein the synchronization labels contain a time stamp.

8. The method of claim 1, wherein the synchronization labels contain a respective sequential value based on a preset starting time and corresponding to the respective time.

9. A software product that is stored on a computer-readable medium and can preferably be installed directly into the internal memory of a computer, wherein said product comprises the program code for a computer program enabling a computer to carry out the steps of claim 1, when the program is run on a computer.

10. A system for controlling data transfer in a multimedia system, comprising:

a group of participants' terminals with which multimedia data generated by participants' terminals contained in the group are sent to one or more participants' terminals contained in the group and played back there, comprising:

central synchronization unit generating synchronization labels containing time information and sending them to each of the participants' terminals contained in the group, wherein the participants' terminals receive the synchronization labels and attach the received synchronization labels to the multimedia data generated in the participant's terminal and send the multimedia data with the received synchronization labels attached to the central synchronization unit, and wherein the central synchronization unit receives the multimedia data with the attached synchronization labels from the participants' terminals and modifies the time information contained in the synchronization labels according to a time context for the multimedia data by the participants' terminals and sends the multimedia data to the participants' terminals, wherein the multimedia data with the attached modified synchronization labels is received in the participants' terminals and played back in the time context corresponding to the modified time information contained in the synchronization labels.

* * * * *